(12) United States Patent
Chen et al.

(10) Patent No.: US 10,026,030 B2
(45) Date of Patent: Jul. 17, 2018

(54) SIMPLE DIFFRACTION GRATINGS FOR PRODUCT IDENTIFICATION

(75) Inventors: Sung-Wei Chen, Las Vegas, NV (US); Christopher J. Rothfuss, Laramie, WY (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 624 days.

(21) Appl. No.: 13/578,419

(22) PCT Filed: Jan. 13, 2012

(86) PCT No.: PCT/US2012/021272
§ 371 (c)(1),
(2), (4) Date: Aug. 10, 2012

(87) PCT Pub. No.: WO2013/105974
PCT Pub. Date: Jul. 18, 2013

(65) Prior Publication Data
US 2013/0184855 A1    Jul. 18, 2013

(51) Int. Cl.
*G06K 19/06* (2006.01)
*B07C 5/34* (2006.01)

(52) U.S. Cl.
CPC ...... *G06K 19/06178* (2013.01); *B07C 5/3412* (2013.01); *G06K 19/06065* (2013.01); *G06K 2019/0629* (2013.01); *Y10T 29/49826* (2015.01)

(58) Field of Classification Search
CPC .. G01J 3/02; G01J 3/18; G01J 3/0229; G01N 2021/317; G01N 21/00; G02B 5/1861; G06K 19/06178; G06K 19/06065; G06K 2019/0629; B07C 5/3412; Y10T 29/49826

USPC ........ 250/339.06, 237 G, 556, 566; 356/328, 356/305

See application file for complete search history.

(56) References Cited

U.S. PATENT DOCUMENTS

| | | | | |
|---|---|---|---|---|
| 4,011,435 A | * | 3/1977 | Phelps | G06K 7/10 235/454 |
| 5,671,308 A | * | 9/1997 | Inoue | G01M 11/3118 356/73.1 |
| 5,742,432 A | | 4/1998 | Bianco | |
| 6,055,076 A | * | 4/2000 | Takahashi et al. | 369/112.1 |
| 7,126,755 B2 | | 10/2006 | Moon et al. | |
| 7,341,189 B2 | | 3/2008 | Mossberg et al. | |
| 2004/0032586 A1 | * | 2/2004 | Nagasaka et al. | 356/328 |
| 2004/0159708 A1 | * | 8/2004 | Yogev et al. | 235/492 |

(Continued)

OTHER PUBLICATIONS

International Search Report and Written Opinion for PCT/US2012/021272 dated Jun. 5, 2012.

*Primary Examiner* — David Porta
*Assistant Examiner* — Blake Riddick (57) ABSTRACT

A system and method for identifying information related to an object. A radiation emitter is configured to direct radiation toward an object, the object including one or more diffraction gratings including encoded information related to the object. A detector is configured to receive modified radiation from the one or more diffraction gratings on the object and transfer the received modified radiation to a processing device operably connected to the detector. The processing device is configured to process the modified radiation and decode the information related to the object encoded in the one or more diffraction gratings.

25 Claims, 4 Drawing Sheets

(56) References Cited

U.S. PATENT DOCUMENTS

| | | | |
|---|---|---|---|
| 2004/0173680 A1* | 9/2004 | Mossberg | G06K 7/12 235/454 |
| 2004/0179267 A1* | 9/2004 | Moon et al. | 359/566 |
| 2005/0002029 A1* | 1/2005 | Gornushkin et al. | 356/328 |
| 2005/0025423 A1* | 2/2005 | Hanaoka et al. | 385/37 |
| 2005/0270603 A1* | 12/2005 | Putnam et al. | 359/2 |
| 2006/0081510 A1* | 4/2006 | Kenny et al. | 209/576 |
| 2006/0139636 A1* | 6/2006 | Kerstan et al. | 356/328 |
| 2006/0291872 A1* | 12/2006 | Mei et al. | 399/12 |
| 2008/0123095 A1* | 5/2008 | Hubner et al. | 356/328 |
| 2011/0216255 A1* | 9/2011 | Miyauchi et al. | 349/19 |
| 2011/0273658 A1* | 11/2011 | Koyama et al. | 349/187 |

* cited by examiner

SIMPLE DIFFRACTION GRATINGS FOR PRODUCT IDENTIFICATION

CLAIM OF PRIORITY

This application is a U.S. national stage filing under 35 U.S.C. § 371 of International Application No. PCT/US12/21272 filed Jan. 13, 2012 entitled "Simple Diffraction Gratings for Product Identification," the disclosure of which is incorporated by reference in its entirety.

BACKGROUND

Identification, classification and sorting of materials or objects has become increasingly important in many areas of industry. For example, plastic recycling is highly sensitive to front-end classification and sorting. Plastic recycling processes generally have low tolerances for material variation. Material misidentification accounts for a large proportion of variation in the recycling process as identification dictates which materials, and in what quantity, are fed into various recycling processes. By misidentifying one or more materials during the recycling process, the end recycled product may not meet a desired quality level.

Many sorting and identification methods rely on processing materials based upon passive methods relying on native properties of the materials themselves, such as molecular composition, melt temperature, and the like. However, the native properties are inherently limited in the amount of information that they can provide. Additionally, a reliance on the native properties does not always result in accurate classification and sorting. For example, a collection of heterogeneous plastics may all have a similar melting temperature while having distinct molecular compositions. Thus, relying on melting temperature would not result in a highly accurate sorting of the heterogeneous plastics.

Various new identification methods such as embedding forensic-like particles into the plastics, chemically bar-coding the plastics, or otherwise tagging the plastics at the time of manufactures are being incorporated for more reliable sorting during recycling. However, cost and implementation are challenging because of scale, increases in cost, difficult process integration, and other similar factors. Additionally, typical markings such as chemical bar-coding or embedding foreign particles alter the original properties of the plastic such as strength and transparency.

SUMMARY

In one general respect, the embodiments disclose a system for identifying information related to an object. The system includes a radiation emitter configured to direct radiation toward an object, a detector configured to receive modified radiation from a diffraction grating on the object, and a processing device operably connected to the detector and configured to determine information related to the object based upon the modified radiation received at the detector.

In another general respect, the embodiments disclose a method of identifying information related to an object. The method includes directing radiation from a radiation emitter to an object, receiving modified radiation directed by a diffraction grating on the object toward a detector, and determining information related to the object at a processing device operably connected to the detector, the information based upon the modified radiation received at the detector.

In another general respect, the embodiments disclose a method of manufacturing an object. The method includes forming an object and applying at least one diffraction grating to the object, wherein the at least one diffraction grating defines information related to the object.

In another general respect, the embodiments disclose an article of manufacture including at least one material used to form an object and at least one diffraction grating defining information related to the material used to form the object.

In another general respect, the embodiments disclose a method of manufacturing an object including injecting a first quantity of a material into a mold, wherein the mold comprises at least one pattern configured to transfer at least one diffraction grating to the material, the at least one diffraction grating defining information related to the material.

In another general respect, the embodiments disclose a mold for forming an object including at least one pattern configured to apply at least one diffraction grating to an object being formed in the mold, the at least one diffraction grating defining information related to the object.

In another general respect, the embodiments disclose a method for sorting plastic objects to be recycled. The method includes directing radiation from a radiation emitter to a plastic object; receiving modified radiation directed by a diffraction grating on the plastic object toward a detector; determining information related to a type of plastic used to manufacture the plastic object at a processing device operably connected to the detector, the information based upon the modified radiation received at the detector; and sorting the plastic object at a sorting device operably connected to the processing device, wherein the sorting is based upon the type of plastic used to manufacture the plastic object.

In another general respect, the embodiments disclose a kit for identifying information related to an object. The kit includes a system for identifying information related to an object; at least one mold for forming the object, the mold comprising at least one pattern configured to apply the diffraction grating to the object being formed in the mold, the at least one diffraction grating defining the information related to the object; and instructions for using the system for identifying information related to an object and the mold for forming the object. The system for identifying information related to the object includes a radiation emitter configured to direct radiation toward an object, a detector configured to receive modified radiation from a diffraction grating on the object, and a processing device operably connected to the detector and configured to determine information related to the object based upon the modified radiation received at the detector.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

As used herein, a "diffraction grating" or "grating" refers to an optical component with a periodic structure configured to split and diffract light into several beams traveling in different directions.

The present disclosure relates to a passive, microscopic tagging or bar-coding of various commodities or products, such as plastics, at the time of manufacture, or after manufacturing, for identification purposes. For example, shortly after manufacture, while the plastic is still malleable, the object may be imprinted or tagged. Alternatively, once the object is manufactured, the object may be imprinted or tagged via a physically altering process such as etching or lithography. The tagging or bar-coding maintains the optical properties of the products, such as the inherent transparency of some plastics, while encompassing low cost and highly selective and sensitive methods and systems for identifying products that are easily integrated into existing manufacturing processes.

The microscopic tagging or bar-coding may include a reflective and/or a transmissive diffraction grating incorporated into a product during or after manufacture. Diffraction gratings are a well-known technology used in multiple applications. Optical applications include monochromators, detection arrays, and holography. A diffraction grating operates when a structure is on the order of, or smaller than, a wavelength of incident radiation.

A common diffraction grating can include a grouping of long, narrow slits with spacing d (and slit width<<d) set in parallel. A maximum wavelength that a grating can diffract is 2d, thereby defining a cutoff response of the grating. When a plane wave is incident on the grating, each slit acts as a point source, and the overall response of the grating may be determined by the Huygens-Fresnel principle, i.e., superimposing the contributions of each individual point source into a collective response. Each individual point source may contribute interfering and additive wave components such that phase differences accumulate at different positions. Gratings may perform in transmission or reflection modes, where the diffracted radiation is observed through or reflected from the grating, respectively.

A grating's response is generally independent of the shapes of elements forming the grating, and may include triangular "blazing," dark/light lines, etched structures, ridges, or other similar structures.

An exemplary grating may be arranged such that the grating responds to non-optical wavelengths such as infrared (IR), microwave radiation and long radio frequency (RF) (e.g., about 1 um to about 1 m), or ultraviolet to sub-optical (e.g., about 10 nm to about 400 nm) wavelengths. The wavelength response(s) of the grating (e.g., frequency response cutoff, spectral bands) to broadband and/or monochromatic sources is exploited to encode information related to the product tagged with the grating. The grating may be imprinted into the product itself or molded, etched or imprinted on or in a coating. Depending on the choice of wavelength response, the grating may be scaled to millimeters or smaller in size.

It should be noted that while a majority of the examples discussed herein are directed to plastics and plastics recycling, the concepts discussed herein may be applied to additional products or goods such as currency, electronic devices, pharmaceuticals, medical devices, pharmaceutical packaging, artwork, computer readable media, glass containers, jewelry, memorabilia, automotive components, credit cards, certified documents, copyrighted works, paper goods, furniture, building materials, aeronautical components, textiles, and other similar goods or materials.

Figure 1A:
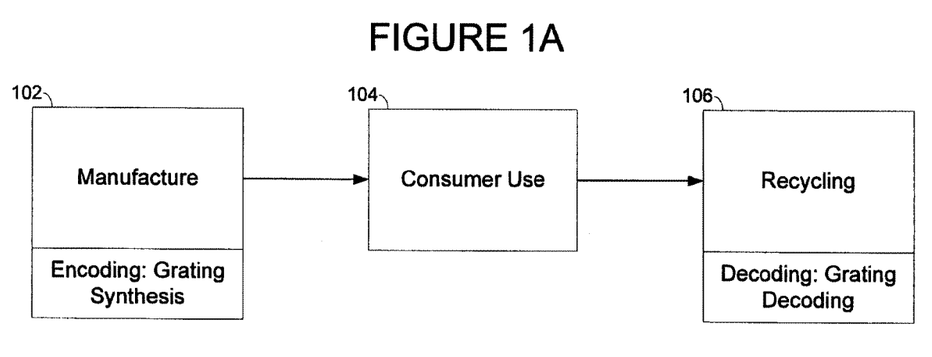
FIGS. 1A and 1B illustrate exemplary flowcharts showing various stages in a product's lifetime.

FIG. 1A illustrates an exemplary timeline for a particular product, for example, a plastic bottle. The bottle is manufactured 102 according to standard and traditional manufacturing techniques. For example, the bottle may be injection-molded, rotationally molded, compression molded, or manufactured by another similar technique. During manufacturing 102, the bottle may be marked or otherwise labeled with information specific to the bottle in a diffraction grating. The diffraction grating may be patterned into a mold for imprint transfer during molding of the plastic bottle. For finer resolution, ion beam etching may be used. Optical microlithography and chemical etching methods may be used as well.

Specifically, micro/nano-lithography may be used to directly form at least one grating on a plastic bottle. For example, a photo-resistant coating on a plastic object may be patterned by microlithography. Diffraction gratings may be sandwiched between polymer layers (similar to holographic gratings). A negative mold may be patterned via lithography. The mold may be stamped or imprinted on a plastic while still malleable. Chemical etching may also be used to pattern a negative mold, or to directly etch a pattern into a plastic product. An exemplary mold is shown and discussed below in regard to FIG. 5. Additionally, physical etching may be used. For example, an array of metal tips may etch grooves into a plastic product.

The gratings may be encoded such that the information contained within the gratings is detectable by applying radiation to the bottle and receiving radiation reflected by the gratings. Based upon the reflected radiation, a computer system may decode the information encoded in the gratings. The information may include material composition of the plastic used to manufacture the bottle, a melting temperature of the plastic, a composition type of the plastic, if one or more additives have been added to the plastic (e.g., an agent to provide added strength), and other similar information. The gratings may be arranged into exemplary markings such as Quick Response (QR) codes, Universal Product Codes (UPCs), microdot arrays, and other similar spatially encoded markings. Additional examples and explanations of individual gratings are explained below in the discussion of FIG. 3.

The gratings may be optionally applied throughout the entirety of the bottle such that any individual portion of the bottle can be identified. For example, if the bottle is cut into pieces, each piece would retain at least a portion of the original gratings and, thus, the information encoded therein.

The manufactured 102, and encoded, bottle is then processed and distributed for consumer use 104. Consumer use 104 may include being filled and made available for retail sale or another similar use. A consumer may purchase or otherwise acquire the bottle, use 104 the bottle or its contents for its intended purpose, and deposit the bottle in an appropriate receiving means for recycling 106 the bottle. An appropriate receiving means may include a neighborhood recycling bin, a personal recycling bin that is collected regularly by a recycling or sanitation authority, or other similar receptacles for receiving recyclable materials.

During recycling 106, the gratings of the bottle may be scanned and any information contained therein decoded. Based upon this information, the bottle may be sorted accordingly based upon its material composition or other classification information such that it is recycled with similar materials, thereby reducing or eliminating potential misclassification and subsequent improper recycling of the bottle. The sorting and classification process is described in more detail below in the discussion of FIG. 2. Similarly, a system for scanning, decoding and sorting is described in more detail below in the discussion of FIG. 4.

Figure 1B:
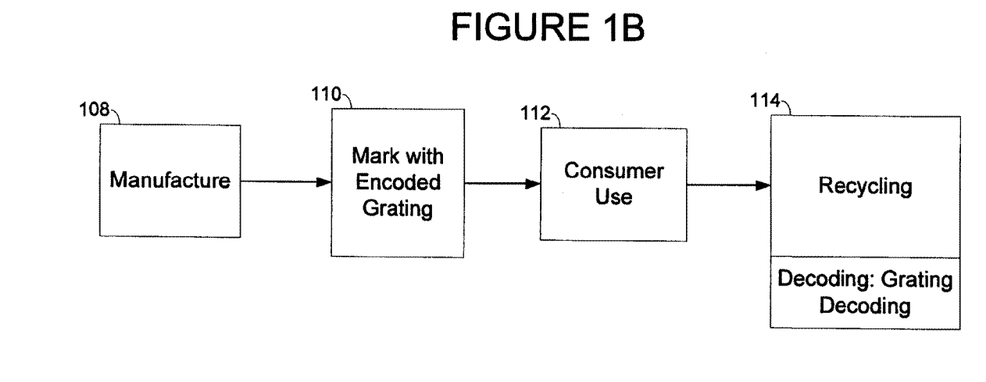

FIG. 1B illustrates an alternative exemplary timeline for a particular product, for example, a plastic bottle. The bottle is manufactured 108 according to standard and traditional manufacturing techniques. After manufacturing 108, the bottle may be marked 110 or otherwise labeled with information specific to the bottle in encoded diffraction gratings. As before, the gratings may be encoded such that the information contained within the grating is detectable by applying radiation to the bottle and receiving radiation reflected by the grating. The gratings may be applied throughout the entirety of the bottle such that any individual portion of the bottle can be identified. For example, if the bottle is cut into pieces, each piece would retain at least a portion of the original gratings and, thus, the information encoded therein.

The bottle may be marked 110 with the encoded gratings via a post-manufacture technique such as chemically etching the gratings into the plastic. Similarly, the encoded gratings may be added via a painting or printing process using a reflective pigment/dye (if applied to an absorptive substrate) or with an absorptive pigment/dye (if applied to a reflective substrate). Additional post-manufacturing techniques such as scoring, engraving, wrapping and other similar marking techniques may be used. The post-manufacture technique(s) may be done shortly after the bottle has been manufactured 108, e.g., as a marking 110 step on an assembly line following the manufacturing process, or as a process performed well after the bottle has been manufactured, e.g., a batch marking process that is performed on an entire day's worth of manufactured bottles at the end of the day, thereby resulting in each bottle in the batch being identically marked.

The manufactured 108, and marked 110, bottle is processed and distributed for consumer use 112. As before, consumer use 112 may include being filled and made available for retail sale or another similar use. A consumer may purchase or otherwise acquire the bottle, use 112 the bottle or its contents for its intended purpose, and deposit the bottle in an appropriate receiving receptacle or center for recycling 114 the bottle.

During recycling 114, the gratings of the bottle may be scanned and any information contained therein decoded. Based upon this information, the bottle may be sorted accordingly based upon its material composition or other classification information such that it is recycled with similar materials.

Figure 2:
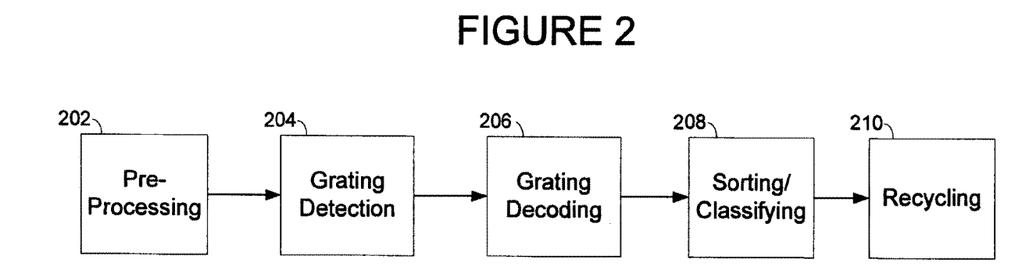
FIG. 2 illustrates an exemplary process for sorting and classifying a product.

FIG. 2 illustrates an exemplary recycling and sorting process. After collection of various recyclable materials (such as the plastic bottles as discussed above in reference to FIGS. 1A and 1B), various pre-processing 202 may be performed such as a generic sorting into classes of materials. For example, the materials may be sorted by size with larger products being separated from smaller products. Additional pre-processing 202 such as cutting the products into smaller sizes may be done as well. The products for recycling (or the pieces of the products to be recycled) may then be scanned such that the gratings included herein are detected 204. A light or other radiation source may direct a first radiation at the products and a detector may be positioned such that any radiation or wavelength response created by the products is received and processed.

The wavelength response of a diffraction grating may be tailored for an appropriate application based upon the arrangement of the diffraction grating. For example, gratings with responses at wavelengths longer than visible light are desirable as periodic structures are easier to construct for longer wavelengths, the response signal is easier to detect, gratings at these wavelengths do not interfere with optical properties and maintain optical transparency of the product, there is little to no interference with dirt and other contamination, and detection equipment for these wavelengths is commonly available, generally inexpensive and easy to use. In some applications, gratings with responses at wavelengths shorter than visible light (e.g., UV) may be desirable. For example, when high information density is necessary, or when UV exposure is already integrated into a processing line, e.g., for UV sterilization, gratings with responses shorter than visible light may be preferable.

Referring again to FIG. 2, the detected 204 grating information may be passed to a computer system or other similar processing device for decoding 206. The decoded 206 information may include information specific to the product marked with the gratings such as material composition of the plastic used to manufacture the bottle, a melting temperature of the plastic, a composition type of the plastic, if one or more additives have been added to the plastic, and other similar information.

Based upon the information determined from the decoded 206 gratings, the product may be classified and sorted 208 with other like products. For example, all plastics with a similar chemical composition may be sorted 208 together for further processing. The sorted 208 products are then recycled 210 according to standard recycling techniques and processes.

Figure 3:
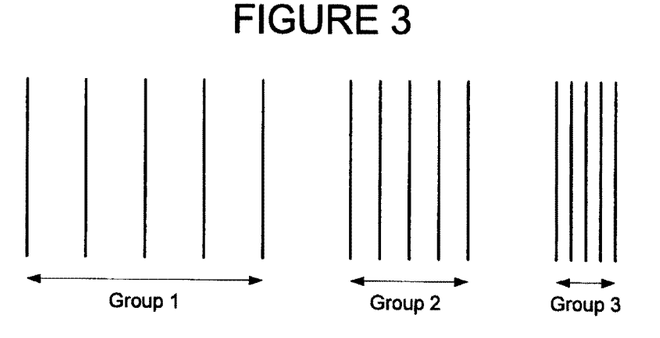
FIG. 3 illustrates exemplary diffraction gratings.

FIG. 3 illustrates an exemplary set of diffraction gratings, organized into Groups 1, 2 and 3. It should be noted these diffraction gratings are not shown to scale, and are included for exemplary purposes only. Information may be encoded in the gratings in various ways. Several exemplary encoding schemes are listed below.

Scheme 1:

A single grating with line spacing of 1 um would not diffract light above 2 um. If viewed with a broadband mid-wavelength IR (MWIR) source, wavelengths below 2 um would diffract and all wavelengths above 2 um would not diffract, thus defining a 2 um cutoff frequency for this grating. Particular cutoff frequencies could be associated with particular material compositions (or other related information), encoding information about those compositions. I Using a broadband source having a wavelength range of 2-5 um, and a frequency detection resolution of 3% (+/−60 nm=0.06 um), the maximum number of possible gratings would be the total width of the wavelength range divided by the frequency detection resolution. In this example, the maximum number of possible gratings is (5 um−2 um)/0.06 um=50 gratings, each of which corresponds to a single cut-off frequency. Each individual encoding may include a pair of gratings, thus resulting in 25 total encodings.

Scheme 2:

A sequential grouping of three diffraction subgratings (such as Groups 1, 2 and 3 as shown in FIG. 3), with each subgrating having five diffraction elements (e.g., lines or blazings), where:

Group 1: d=1.25 um=2.5 um/2 (wavelength cutoff: 2.5 um)
Group 2: d=1.50 um=3.0 um/2 (wavelength cutoff: 3.0 um)
Group 3: d=2.00 um=4.0 um/2 (wavelength cutoff: 4.0 um)

When viewed with a broadband MWIR, this grouped diffraction grating would appear as a diffraction grating with several cutoffs at the respective frequencies. To encode information, combinations of cutoff frequencies may be associated with particular plastic compositions (or other related information). Using the same broadband source as used in Scheme 1, this arrangement results in 25^3=15,625 combinations.

Scheme 3:

Similar to Scheme 2, this scheme encodes information based upon the difference between cutoff frequencies. For example, with a sequential grouping of three subgratings, with each with each subgrating having five diffraction elements, where:

Group 1: d=1.25 um=2.5 um/2 (wavelength cutoff: 2.5 um)
Group 2: d=1.50 um=3.0 um/2 (wavelength cutoff: 3.0 um)
Group 3: d=2.00 um=4.0 um/2 (wavelength cutoff: 4.0 um)
Group 1/Group 2 frequency cutoff difference=1.5 um-1.25 um=0.25 um
Group 2/Group 3 frequency cutoff difference=2.0 um-1.5 um=0.50 um To encode information, combinations of cutoff frequency differences may be associated with particular material compositions (or other related information). This arrangement produces $(2*25)^2=2500$ combinations, allowing for negative differences. By measuring the difference in cutoff frequencies, and not the absolute frequencies as done in Scheme 2, there is no angular dependence of the measurement and orientation of the gratings being scanned is a non-factor.

Scheme 4:

Similar to Scheme 3, this scheme encodes information based upon the difference between cutoff frequencies. However, knowing the directionality of each grouped diffraction grating produces in more unique encodings. In Scheme 3, only palindromic sequences would be unique. All other sequences may be oriented from left-to-right or right-to-left, thereby effectively halving the number of combinations used to encode information. One exemplary arrangement for defining directionality is to have a defined leader sequence. For example, a reference subgrating may be placed at the beginning of each grouped diffraction grating so that its cutoff frequency always has a difference of 0.25 um from the next subgrating. Modifying the above example shown in Scheme 3, this would result in a sequential grouping of four subgratings, with each with each subgrating having five diffraction elements, where:

Group 1: d=1.22 um=2.5 um/2 (wavelength cutoff: 2.5 um)
Group 2: d=1.50 um=3.0 um/2 (wavelength cutoff: 3.0 um)
Group 3: d=2.00 um=4.0 um/2 (wavelength cutoff: 4.0 um)
Group 4: d=2.20 um=4.4 um/2 (wavelength cutoff: 4.4 um)
Group 1/Group 2 frequency cutoff difference=1.5 um-1.25 um=0.25 um
Group 2/Group 3 frequency cutoff difference=2.0 um-1.5 um=0.50 um
Group 3/Group 4 frequency cutoff difference=2.2 um-2.0 um=0.20 um To encode information, combinations of cutoff frequency differences may be associated with particular material compositions (or other related information). This arrangement produces $(2*25)*(2*(25-1))=2450$ combinations, slightly less than Scheme 3 but with more unique combinations than Scheme 3.

The overall size of an exemplary group diffraction grating may be less than 6 mm. This size is below the typical 10 mm size a plastic product is cut to for recycling purposes, so each (or a large number of) pieces of a plastic components would retain the encoded information contained in the grouped diffraction grating.

Other combinations, frequency differences, radiation types (which may dictate the minimum/maximum grating spacing), and numbers of groups may be used. In general, the number of combinations scales exponentially with the number of groups used. Examples of various other arrangements are shown below in Tables 1 and 2.

Table 1 illustrates various related data for a set of radiation types and given wavelengths. The data includes exemplary minimum and maximum sizes of diffraction gratings for example radiation wavelengths, number of elements per grating, and number of groups of gratings:

TABLE 1

| Radiation Type | Min Wavelength (um) | Max Wavelength (um) | Number of Elements (Blazings) | Element (Blazing) Size (um) | Groups | Min Size (um) | Max Size (um) |
| --- | --- | --- | --- | --- | --- | --- | --- |
| IR | 2.00 | 5.00 | 5 | 0.50 | 3 | 23 | 45 |
| IR | 2.00 | 5.00 | 5 | 0.50 | 4 | 30 | 60 |
| IR | 2.00 | 5.00 | 5 | 0.50 | 5 | 38 | 75 |
| IR | 2.00 | 5.00 | 5 | 0.50 | 6 | 45 | 90 |
| Microwave (X-band) | 25.00 | 37.00 | 5 | 5.00 | 3 | 263 | 353 |
| Microwave (X-band) | 25.00 | 37.00 | 5 | 5.00 | 4 | 350 | 470 |
| Microwave (X-band) | 25.00 | 37.00 | 5 | 5.00 | 5 | 438 | 588 |
| Microwave (X-band) | 25.00 | 37.00 | 5 | 5.00 | 6 | 525 | 705 |
| Microwave (X-band) | 25.00 | 37.00 | 5 | 5.00 | 7 | 613 | 823 |
| Microwave (X-band) | 25.00 | 37.00 | 5 | 5.00 | 8 | 700 | 940 |

Table 2 illustrates exemplary error tolerances, encodings per group and total possible combinations for the set of radiation types and given wavelengths as shown in Table 1:

TABLE 2

| Radiation Type | Min Wavelength (nm) | Max Wavelength (nm) | Error Tolerance (discrimination) | Encodings (per group) | Groups | Combinations |
| --- | --- | --- | --- | --- | --- | --- |
| IR | 2.00 | 5.00 | 0.06 | 25 | 3 | 49 |
| IR | 2.00 | 5.00 | 0.06 | 25 | 4 | 2,450 |
| IR | 2.00 | 5.00 | 0.06 | 25 | 5 | 122,500 |
| IR | 2.00 | 5.00 | 0.06 | 25 | 6 | 6,125,000 |
| Microwave (X-band) | 25.00 | 37.00 | 0.75 | 8 | 3 | 15 |

TABLE 2-continued

| Radiation Type | Min Wavelength (nm) | Max Wavelength (nm) | Error Tolerance (discrimination) | Encodings (per group) | Groups | Combinations |
|---|---|---|---|---|---|---|
| Microwave (X-band) | 25.00 | 37.00 | 0.75 | 8 | 4 | 240 |
| Microwave (X-band) | 25.00 | 37.00 | 0.75 | 8 | 5 | 3,840 |
| Microwave (X-band) | 25.00 | 37.00 | 0.75 | 8 | 6 | 61,440 |
| Microwave (X-band) | 25.00 | 37.00 | 0.75 | 8 | 7 | 983,040 |
| Microwave (X-band) | 25.00 | 37.00 | 0.75 | 8 | 8 | 15,728,640 |

For example, looking at both Tables 1 and 2, when using a microwave (X-Band) radiation source, using 5 grating elements organized in 8 groups, each group having 8 encodings, there are 15,728,640 possible combinations.

Alternative schemes beyond those outlined above may also be used. For example, instead of a full wavelength diffraction grating, a subdiffraction transmission grating may be used (e.g., d=less than or equal to ½ the wavelength). As opposed to frequency cutoff detection, birefringence or double refraction may be detected in the grating zero order. A zero order spatial orientation implies an incident normal orientation in subdiffration gratings. This allows another mode of detection that is robust to frequency noise, but uses zero order spatial orientation.

Figure 4:
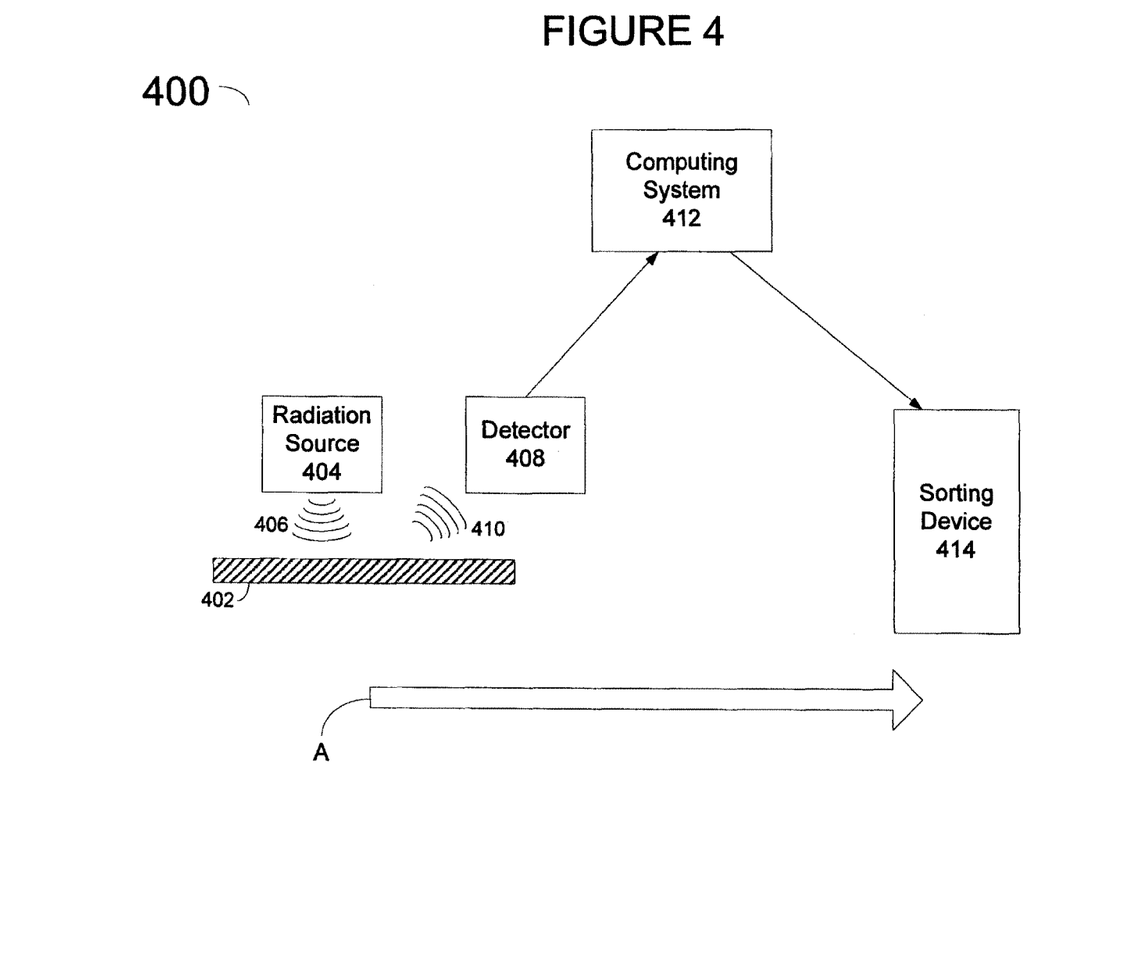
FIG. 4 illustrates an exemplary detection system.

FIG. 4 illustrates an exemplary system 400 for detecting and sorting various products according to information encoded in one or more diffraction gratings included in the product. A product 402 travels through the process as indicated by arrow "A". The product 402 includes one or more gratings as discussed above, the gratings including encoded information related to the product. A radiation source 404, such as a MWIR broadband radiation source, an infrared emitter, a microwave emitter or another similar radiation source, may direct radiation 406 at the product 402. As discussed above, the gratings may be arranged such that the grating response reflected (or otherwise transmitted) by the product 402 includes various frequency related information such as frequency cutoffs related to the arrangement of the gratings. A detector 408, such as an IR detector, may be positioned to receive the reflected radiation 410. The detector may include an infrared detector, an infrared camera, a monochronometer, a spectrometer, a microwave detection unit, an antenna, a microwave filter and other similar detectors.

The detector 408 may be operably connected to a computing system 412. The detector 408 may transfer the received grating response (as contained in the reflected radiation 410) to the computer system 412 for decoding. During decoding 412, and depending on the information encoded in the grating and the type of grating used, the computer system may also be able to perform error correction in the information in the event a grating response is incomplete or inaccurately received.

Based upon the decoded information, the computer system 412 may instruct a sorting device 414 to divert the product 402 to an appropriate area, pile or other collection means for further processing. For example, the sorting device 414 may be a series of pneumatic gates on a conveyor belt configured to alter the path of the product 402 through the recycling process.

Figure 5:
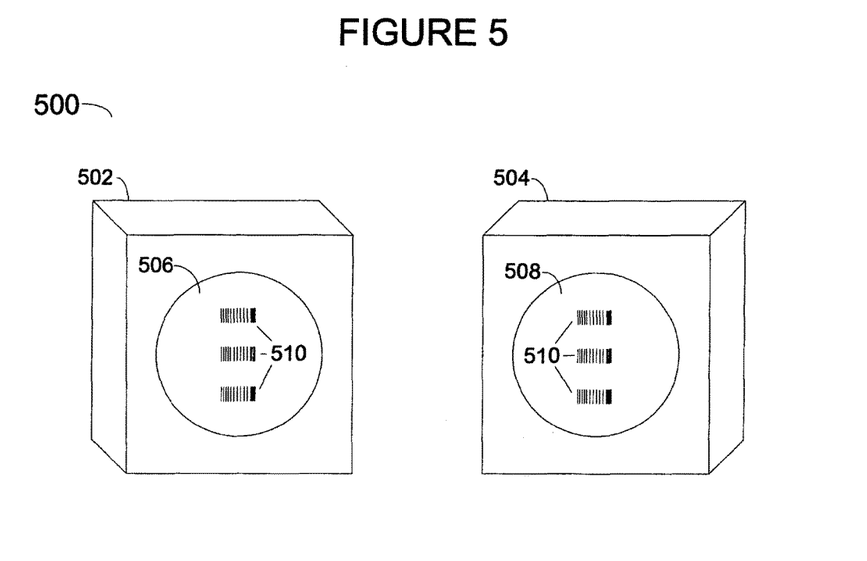
FIG. 5 illustrates an exemplary mold for manufacturing a product including exemplary diffraction gratings.

FIG. 5 illustrates an exemplary spherical mold 500 for producing a product including various diffraction gratings. The mold may include two halves 502 and 504, each half having a recess 506 and 508 respectively. Each recess 506 and 508 may be etched (e.g., via chemical etching as discussed above) with one or more diffraction gratings 510 such that any product molded in the mold 500 includes an imprint of the diffraction gratings. For example, the mold 500 may be a rotational mold. An amount of liquefied plastic may be poured into one of the recesses 506 and 508, the halves 502 and 504 may be secured together, and the mold 500 may be rotated continually until the plastic hardens. The halves 502 and 504 may then be separated and the plastic product removed from the mold 500, the plastic product including an imprint of the gratings 510.

It should be noted the embodiments as shown in the figures are shown by way of example only. Additional changes/improvements to the embodiments as discussed herein may be made. For example, transmission gratings may be used as opposed to reflection gratings, particularly for materials transparent to the incident radiation. Also, other radiation forms may be used such as gamma rays and x-rays. Similarly, other coding schemes may be implemented, including optical bar-coding, RFID and various error correcting codes. Additionally, the gratings as discussed herein may be implemented in various other methods. For example, a label including various gratings may be applied to a product well after the product is manufactured for identification purposes.

Example 1: Recycling

MWIR gratings may be included on a series of products having known response frequency cutoffs. The gratings are arranged to operate in a wavelength range of 2-5 um, with elements approximately 0.5 um in width, the full structure has a maximum size of <~1 mm, and a total number of encodable combinations of 122,500 (See Tables 1 and 2). Various properties of the products are encoded in the diffraction gratings during manufacture. The properties include melt temperature, composition type, and additives.

To prepare for recycling, the products are crushed into pieces approximately 10 mm by 10 mm. A simple reflective imaging configuration illuminates the particles with a broadband MWIR source (e.g., a filament based source) and images these particles using inexpensive IR detection. The captured images may include the particle response having a spectrum with the absence of the frequencies corresponding to those frequencies above the cutoffs. The images are processed to determine the information encoded in the gratings, and the pieces are sorted based upon the decoded information.

Specifically, a supplier manufactures polypropylene bottles for a bottled water company. The bottle supplier modifies their molds such that each bottle manufactured includes gratings included encoded information indicating the composition of the material used to manufacture the bottle (e.g., polypropylene $(C_3H_6)_n$), the meting point of the polypropylene (e.g., 150° C.), and any additives added to the polypropylene (e.g., antistatic additives). The gratings are placed throughout the bottle as discussed above such that the optical properties of the bottle remain unchanged. After the water bottle is used and recycled, a recycling facility crushes the bottle into pieces 10 cm square. The pieces are moved via a conveyor belt to a sorting system. A radiation source directs a 2 um to 5 um broadband radiation signal at the pieces and a detector receives any response signal generated by the gratings. A processing device decodes information contained in the grating responses to determine information related to the individual pieces of plastic being recycled. For each of the pieces of the water bottle, the processing device decodes the information related to the specific polypropylene used, the associated melting point of the polypropylene, and any additives contained therein. The pieces of the water bottle are then sorted accordingly to be placed with other similar plastics for further processing.

Example 2: Eliminating Counterfeit Drugs

A pharmaceutical company encodes various information onto medication packaging or the medication itself in an effort to prevent generic or counterfeit drug companies from using identical packaging to fool pharmacies or other medication distributors. The pharmaceutical company uses an encoding method that produces a high number of combinations such that the company can change the encoding regularly (e.g., weekly), thereby preventing a counterfeiter from copying the packaging over time. The pharmaceutical company may supply a scanning device to each of its licensed wholesalers, distributors and/or pharmacies. Upon receiving a shipment, the receiver can scan the packaging to ensure the shipment is not counterfeit. The scanner may be operably connected via a communications network with a database maintained by the pharmaceutical company. The company may regularly update the database to include new information related to each shipment (or batch of shipments). Thus, the receiver of the shipment can scan the packages, access the database and determine if the information encoded within the gratings included in the packaging is accurate.

Specifically, a drug manufacture produces a certain medication in a capsule form. Each coating on the capsule includes gratings including encoded information related to the location and date of manufacture of the capsules. Similarly, the packaging for the capsules includes gratings including encoded information related to location and date of manufacture of the capsules, as well as other information such as quantity and expiration dates. A pharmacist or other distributor of the capsules has a handheld device operably connected to a processing device. The pharmacist scans the etchings on the packaging. The processing device connects to a database maintained by the drug manufacturer to ensure the information encoded in the gratings is accurate. For additional security, the pharmacist scans one or more individual capsules to ensure the capsules belong in that packaging and are not counterfeit. In order to reduce counterfeiters from marking counterfeit products in a similar manner, the drug manufacturer changes the gratings used regularly, updating the database accordingly.

Example 3: Authenticating Goods

A government printing agency or mint may use one or more encoded diffraction gratings to authenticate currency, as well as components used to manufacture the currency. Plates and molds used in the printing and minting of paper and coin money may be etched with one or more diffraction gratings. The gratings are used to authenticate each plate or mold prior to printing or minting money. Additionally, coins produced by the etched plates or molds may be authenticated throughout the lifetime of the coins by scanning and verifying the imprinted gratings in the coins.

Similarly, an art authentication company may use a similar system to authenticate and track artwork. A frame or other inconspicuous location on a piece of art may be etched with one or more gratings including information related to the piece of art. However, the size of the gratings does not result in any noticeable marks to the piece of art. The authenticity of the piece of art can then be traced as the piece of art is bought and sold in the future without need of further authentication.

Specifically, an auction company etches gratings into various points on the frame as well as the back of the canvas of a watercolor painting being auctioned. Information encoded in the gratings is maintained in a database associated with the auction company or a similar art verification company. When the painting is being sold again (or for other verification purposes), the gratings on the canvas and frame are scanned and decoded to ensure the painting and frame are not counterfeits or reproductions.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for identifying information related to an object, the system comprising:
   a radiation emitter configured to direct radiation toward an object;
   a detector configured to receive modified radiation from a non-optical wavelength diffraction grating on the object, wherein the non-optical wavelength diffraction grating comprises at least three sub-gratings, each of the sub-gratings having a different element spacing so that the non-optical wavelength diffraction grating is associated with a plurality of element spacings, wherein the non-optical wavelength diffraction grating comprises a reference sub-grating configured to define a directionality of the non-optical wavelength diffraction grating, and each of the at least three sub-gratings is positioned in one of ascending and descending order based on a frequency cutoff difference; and
   a processing device operably connected to the detector and configured to determine information related to the object based upon the modified radiation received at the detector, wherein determining the information comprises:
      determining the plurality of element spacings associated with the non-optical wavelength diffraction grating,
      determining one or more frequency cutoff differences associated with the at least three sub-gratings, and
      decoding the plurality of element spacings and the one or more frequency cutoff differences based on the directionality of the non-optical wavelength diffraction grating to determine the information related to the object, wherein each frequency cutoff difference for adjacent sub-gratings comprises different information related to the object.

2. The system of claim 1, wherein the non-optical wavelength diffraction grating is a reflective non-optical wavelength diffraction grating.

3. The system of claim 1, wherein the radiation emitter comprises at least one of an infrared emitter and a microwave emitter.

4. The system of claim 1, wherein the detector comprises at least one of an infrared detector, an infrared camera, a monochronometer, a spectrometer, a microwave detection unit, an antenna and a microwave filter.

5. The system of claim 1, further comprising a sorting device configured to sort the object based upon a determination by the processing device of the information related to the object.

6. The system of claim 1, wherein the information related to the object comprises at least one of a material composition of the object, a melting temperature of the object, a composition type of the object and one or more additives added to the object.

7. The system of claim 1, wherein determining the plurality of element spacings associated with the non-optical wavelength diffraction grating comprises determining a plurality of frequency cutoffs associated with the non-optical wavelength diffraction grating.

8. A method of identifying information related to an object, the method comprising:
directing radiation from a radiation emitter to an object;
receiving modified radiation directed by a non-optical wavelength diffraction grating on the object toward a detector, wherein the non-optical wavelength diffraction grating comprises at least three sub-gratings, each of the sub-gratings having a different element spacing so that the non-optical wavelength diffraction grating is associated with a plurality of element spacings, wherein the non-optical wavelength diffraction grating comprises a reference sub-grating configured to define a directionality of the non-optical wavelength diffraction grating, and each of the at least three sub-gratings is positioned in one of ascending and descending order based on a frequency cutoff difference; and
determining information related to the object at a processing device operably connected to the detector, the information based upon the modified radiation received at the detector, wherein determining the information comprises:
determining the plurality of element spacings associated with the non-optical wavelength diffraction grating,
determining one or more frequency cutoff differences associated with the at least three sub-gratings, and
decoding the plurality of element spacings and the one or more frequency cutoff differences based on the directionality of the non-optical wavelength diffraction grating to determine the information related to the object, wherein each frequency cutoff difference for adjacent sub-gratings comprises different information related to the object.

9. The method of claim 8, wherein receiving the modified radiation comprises receiving modified radiation reflected from a reflective non-optical wavelength diffraction grating on the object.

10. The method of claim 8, further comprising sorting at a sorting device operably connected to the processing device, wherein sorting the object is based upon the determined information.

11. The method of claim 8, wherein the radiation emitter comprises at least one of an infrared emitter and a microwave emitter.

12. The method of claim 8, wherein the detector comprises at least one of an infrared detector, an infrared camera, a monochronometer, a spectrometer, a microwave detection unit, an antenna and a microwave filter.

13. The method of claim 8, wherein the information related to the object comprises at least one of a material composition of the object, a melting temperature of the object, a composition type of the object and one or more additives added to the object.

14. A method of manufacturing an object, the method comprising:
forming an object;
applying at least one non-optical wavelength diffraction grating to the object, wherein the at least one non-optical wavelength diffraction grating defines information related to the object, wherein the non-optical wavelength diffraction grating comprises at least three sub-gratings, each of the sub-gratings having a different element spacing so that the non-optical wavelength diffraction grating is associated with a plurality of element spacings; and
providing a reference sub-grating configured to define a directionality of the non-optical wavelength diffraction grating,
wherein each of the at least three sub-gratings is positioned in one of ascending and descending order based on a frequency cutoff difference,
wherein each frequency cutoff difference for adjacent sub-gratings comprises different information related to the object.

15. The method of claim 14, further comprising determining the at least one non-optical wavelength diffraction grating based on the information related to the object.

16. The method of claim 14, wherein forming the object comprises at least one of:
extruding a quantity of a polymer through at least one die to form the object; and
filling a mold with a quantity of a polymer to form the object.

17. The method of claim 14, wherein forming the object and applying at least one non-optical wavelength diffraction grating to the object are simultaneous.

18. The method of claim 14, wherein the object is formed prior to the non-optical wavelength diffraction grating being applied to the object.

19. The method of claim 14, wherein the applying at least one non-optical wavelength diffraction grating to the object comprises at least one of printing, molding, lithography, chemical etching, physical etching, radiation etching and coating.

20. The method of claim 14, wherein the information related to the object comprises at least one of a material composition of the object, a melting temperature of the object, a composition type of the object and one or more additives added to the object.

21. A method for sorting plastic objects to be recycled, the method comprising:
directing radiation from a radiation emitter to a plastic object;
receiving modified radiation directed by a non-optical wavelength diffraction grating on the plastic object toward a detector, wherein the non-optical wavelength diffraction grating comprises at least three sub-gratings, each of the sub-gratings having a different element spacing so that the non-optical wavelength diffraction grating is associated with a plurality of element spacings, wherein the non-optical wavelength diffraction grating comprises a reference sub-grating configured to define a directionality of the non-optical wavelength diffraction grating, and each of at least three sub-gratings is positioned in one of: ascending and descending order based on a frequency cutoff difference;
determining information related to a type of plastic used to manufacture the plastic object at a processing device operably connected to the detector, the information based upon the modified radiation received at the detector, wherein determining the information comprises:
determining the plurality of element spacings associated with the non-optical wavelength diffraction grating,
determining one or more frequency cutoff differences associated with the at least three sub-gratings, and
decoding the plurality of element spacings and the one or more frequency cutoff differences based on the directionality of the non-optical wavelength diffraction grating to determine the information related to the object, wherein each frequency cutoff difference for adjacent sub-gratings comprises different information related to the object; and sorting the plastic object at a sorting device operably connected to the processing device, wherein the sorting is based upon the type of plastic used to manufacture the plastic object.

22. The method of claim 21, wherein the receiving modified radiation comprises receiving modified radiation reflected from a reflective non-optical wavelength diffraction grating on the plastic object.

23. The method of claim 21, wherein the radiation emitter comprises at least one of an infrared emitter and a microwave emitter.

24. The method of claim 21, wherein the detector comprises at least one of an infrared detector, an infrared camera, a monochronometer, a spectrometer, a microwave detection unit, an antenna and a microwave filter.

25. The method of claim 21, wherein the information related to the type of plastic used to manufacture the plastic object comprises at least one of a material composition of the plastic, a melting temperature of the plastic and one or more additives added to the plastic.

* * * * *